Feb. 5, 1963  C. NORTON  3,076,962
AIRCRAFT COLLISION AVOIDANCE
Filed June 3, 1957  2 Sheets-Sheet 1

INVENTOR.
Calhoun Norton
BY:
Olson & Trexler
attys.

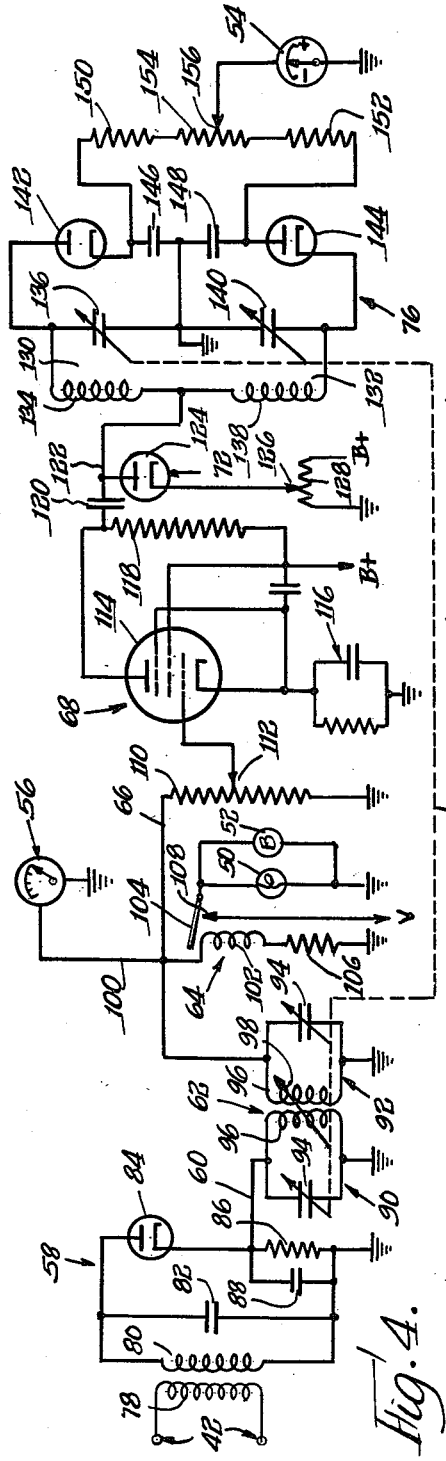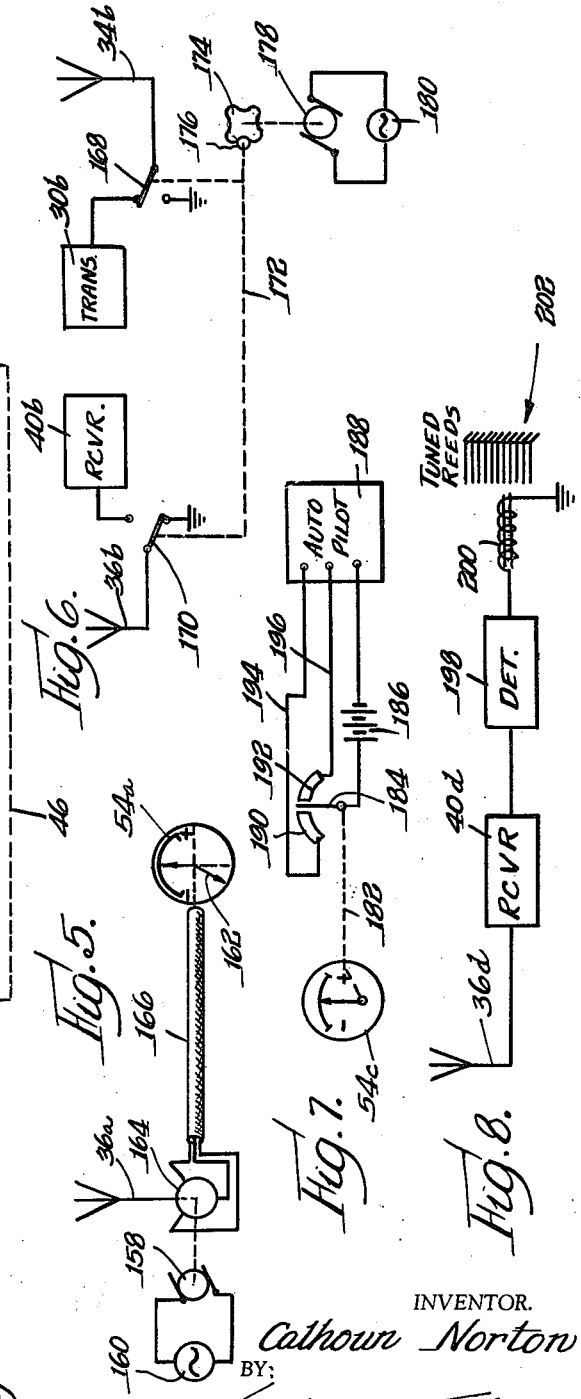

United States Patent Office 3,076,962
Patented Feb. 5, 1963

3,076,962
AIRCRAFT COLLISION AVOIDANCE
Calhoun Norton, Glenview, Ill., assignor to Arens Controls, Inc., Evanston, Ill., a corporation of Illinois
Filed June 3, 1957, Ser. No. 663,206
4 Claims. (Cl. 343—112)

This invention is concerned with apparatus or devices for preventing aircraft collisions.

Airways have become sufficiently crowded in recent years that collisions or near misses between aircraft have occurred frequently. In congested areas, particularly over air fields, the problem is at the present time held satisfactorily under control by radio instructions from the ground to each aircraft in the vicinity. Furthermore, air crews are well aware that other aircraft are in the vicinity in such areas, and a constant alert is maintained.

The problem is most acute in relatively remote or non-congested areas. There is a natural tendency for air crews to relax in such areas, since it is reasonable to suppose that no other plane would be sufficiently close to cause collision danger. Furthermore, the visibility from the cockpit of most airplanes is restricted, particularly to the rear, and above and below.

Accordingly, it will be apparent that some apparatus or system that will guard against collisions in relatively noncongested areas is of extreme importance, whereas the problem is not of such great importance in congested areas.

In order for a mid-air collision to occur, it will be understood that two aircraft must at the same time arrive at the same latitude and the same longitude, and be at the same altitude. To render a mid-air collision impossible, it is only necessary to insure that one of these conditions is not fulfilled. The height of an airplane is readily determined quite precisely, much more so than the latitude and longitude, and the simplest approach to the problem therefore is to insure that two aircraft within a given vicinity are not at the same height at the same time.

Radar systems are now available which would make it possible for the air crew of any given craft to determine the precise location of all aircraft in the vicinity. However, bearing in mind the fact that aircraft do not generally climb or descend very rapidly except in congested areas, which are already under control, it will be seen that it is necessary to know only the location of other aircraft which are within a given altitude range. Radar equipment, as noted above, would solve the problem, even though it would provide more information than necessary, but it is much too expensive to be economically feasible in ordinary civilian aircraft, and it is also much too heavy. Furthermore, it requires an extra crew member and a specially trained radar operator, to watch the radar screen constantly. The addition of such personnel adds further weight and cost, and it is to be doubted whether any human being can be expected to remain completely alert to a generally empty radar screen over a period of many hours.

Accordingly, it is an object of this invention to provide apparatus which is simple in nature, inexpensive, and reliable to provide warning of other aircraft in possible collision proximity.

Furthermore, it is an object of this invention to provide such apparatus which has an alarm system, providing preferably auditory or visible signals for alerting a pilot to the presence of other aircraft within a designated vicinity as to distance and relative altitude.

Yet another object of this invention is to provide apparatus for indicating to a pilot the relative difference in altitude between his aircraft and another aircraft in the vicinity, and further indicating which aircraft is relatively higher.

It is another object of this invention to provide an apparatus for alerting a pilot to the presence of other aircraft within a given vicinity, and indicating the relative altitude, which aircraft is higher, and further indicating the direction and approximate distance of such other aircraft.

It is an ancillary object of the invention to provide apparatus for use in an airplane or the like for detecting the presence of other aircraft within a given vicinity and relative altitude range, and automatically causing the higher aircraft to climb and the lower aircraft to descend until the two aircraft are separated in altitude by a predetermined minimum height.

In accordance with the foregoing, this invention proposes a cooperative warning or control system wherein each aircraft is provided with both a radio transmitter and a radio receiver. Such radio transmitters and receivers will all operate at a fixed carrier frequency, for example, 150.1 mc., having a limited range, preferably on the order of sixty miles. Each transmitter is provided with a modulating signal which is a function of the altitude of the aircraft in which it is mounted. It is not necessary that the altitude be corrected to an absolute or sea level basis, since it is only necessary to locate adjacent aircraft as to relative height. Therefore, in its simplest form, this invention comprehends the provision of an aneroid barometer or altimeter type of instrument which is preset for standard conditions. Obviously, all aircraft in a given vicinity will be flying in the same air mass of uniform pressure, and over the same terrain. Accordingly, all errors will cancel out in the derivation of relative altitudes.

Correspondingly, each radio receiver is provided with suitable equipment for demodulating the signal received from an adjacent aircraft and for comparing it with the modulating signal of the aircraft in which the receiver is mounted. In the simplest form of the invention, only the altitude difference, and the intelligence of which plane is higher are indicated. Thus, the pilot immediately will know whether he should climb or descend in order to eliminate the possibility of a collision. Signals outside of those within a given altitude range relative to any plane in question preferably are discarded. The suggested range of sixty miles allows adequate time for taking evasive action, even at the maximum speed that two jet airplanes might close upon one another when headed in opposite directions.

The invention will be more fully understood, as will objects and advantages in addition to those heretofore enumerated, with reference to the following description when taken in connection with the accompanying drawings wherein:

FIG. 4 is a schematic wiring diagram corresponding to the block diagram of FIG. 3;

FIG. 5 is a schematic diagram showing a modification of the invention allowing nearby aircraft to be identified as to direction;

FIG. 6 is a block diagram generally equivalent to FIG. 2, and forming a modification thereof;

FIG. 7 is a schematic diagram showing a modification effecting automatic separation of adjacent aircraft; and FIG. 8 is a block diagram showing a modification allowing a pilot to ascertain the relative altitudes of a plurality of adjacent aircraft.

Figure 1:
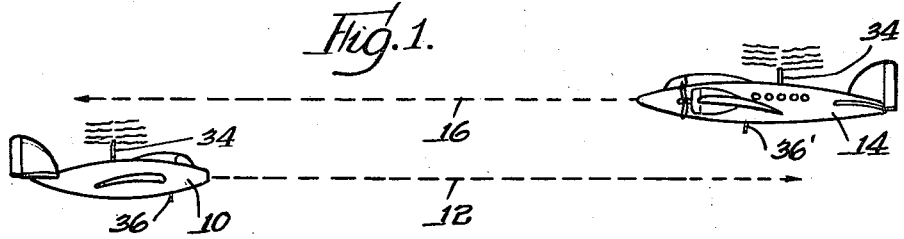
FIG. 1 is a somewhat schematic showing of a pair of airplanes flying toward one another at slightly displaced altitudes.

Referring now in greater particularity to the drawings, there will be seen in FIG. 1 an airplane 10 flying along a path 12 in opposite direction to an airplane 14 flying along a path 16. The paths 12 and 16 overlie one another, but the path 16 is spaced somewhat above the path 12. Airplanes often fly in opposite directions along paths displaced one thousand feet in altitude. Therefore, neither pilot need be concerned about the proximity of the other airplane if it is vertically displaced by one thousand feet or more relative to his airplane. Accordingly, in accordance with the principles of this invention, neither pilot would be notified of the presence of the other airplane under such conditions. If the airplanes are somewhat closer, eight hundred feet appearing at the present time to be a satisfactory arbitrary distance, each pilot is automatically warned of the presence and location of the other airplane. It will be apparent that the two airplanes could pass one another at a difference in altitude of much less than eight hundred feet without colliding. However, it should be borne in mind that the rates of climb of present day aircraft are rather substantial and that the size of present day aircraft would make it possible for airplanes displaced vertically by as much as two hundred feet to interlock wings if both should bank.

Figure 2:
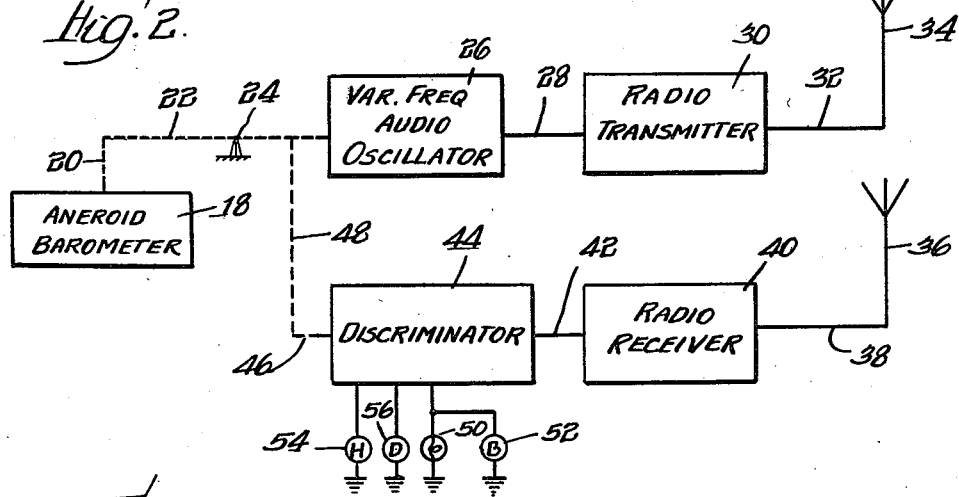
FIG. 2 is a block diagram illustrating the principles of this invention.

Referring now to FIG. 2, there will be seen a system or apparatus which is installed in each airplane. This system includes an aneroid barometer 18 which is sealed under standard conditions, and which therefore provides an indication of altitude. As aforenoted, errors in height above sea level will be introduced by variations in air pressure, but no correction need be made for this, since all of the barometers 18 in a given area will be subject to the same error, the error thereby cancelling out. All that it is necessary to known is the relative altitude of nearby aircraft, and to this end the actual height above he terrain is of no importance.

The barometer 18 is connected, as through a link 20 and a lever 22 pivoted at 24 to a variable frequency audio oscillator 26. Such oscillators are well known in the art, and any suitable type may be used. The oscillator is suitably calibrated against the barometer to produce oscillations varying, preferably, linearly, with altitude, starting with a frequency on the order of one hundred cycles for sea level and running as high as ten thousand to fifteen thousand cycles for some selected upper limit of altitude, such as thirty thousand to fifty thousand feet. It is to be understood that the oscillator 26 could generate frequencies other than audio, such as supersonic, or even relatively low radio frequencies. The essential thing is that the oscillator 26 by capable of matching against the oscillations of a generally similar oscillator, and the audio oscillator is suggested as being suitable for this purpose.

The audio oscillator 26 is connected as at 28 to a radio transmitter 30. The carrier wave of the radio transmitter is preferably of a sufficiently high frequency as to be limited to a short range transmission, such as line of sight transmission. As previously has been indicated, a 60-mile range is suggested, and a carrier frequency of 150.1 mc. might be found satisfactory. As will be understood, the carrier wave of the radio transmitter is modulated by the output frequency of the oscillator 26. The transmitter 30 is connected as at 32 to a transmitting antenna 34, the antenna on the plane 14 being distinguished as 34'.

Each system also includes a receiving antenna 36, that on the airplane 14 being indicated as 36', connected as at 38 to a radio receiver 40 of any suitable design. The signal from the radio receiver is applied as at 42 to a discriminator 44. The discriminator is tuned as at 46 by a link 48 connected to the barometer lever 22. The internal construction of the discriminator is such as to cause a response to signals from airplanes within a designated height range, such as eight hundred feet above and below that of the primary aircraft. The discriminator is connected so as to operate a warning light 50, and an auditory warning signal such as a buzzer 52. The discriminator also actuates a height meter 54 indicating the height of the adjacent aircraft above or below the primary aircraft, and a distance meter 56 for indicating the distance between the two aircraft.

Figure 3:
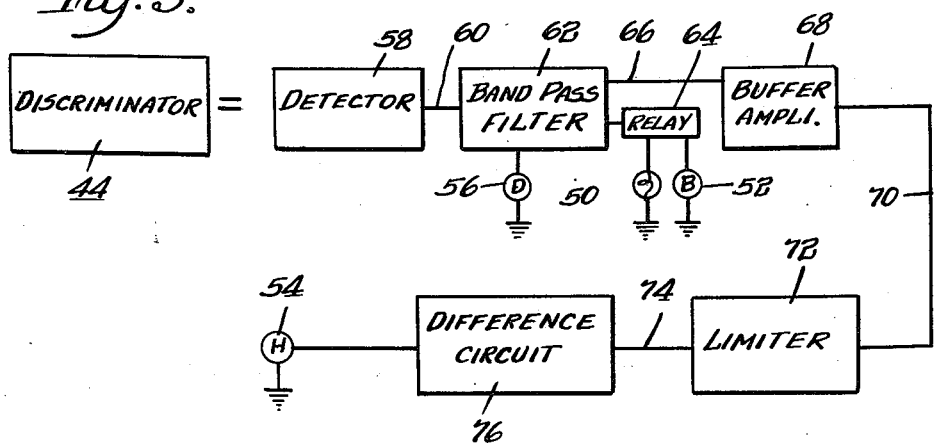
FIG. 3 is another block diagram showing certain details of one of the parts of FIG. 2.

The internal construction of the discriminator 44 is shown in block diagram form in FIG. 3. The discriminator includes a detector 58. As will be understood, the receiving antenna 36 tends to receive a signal both from the airplane 10 on which it is mounted, and from the nearby airplane 14. It will be understood that the antenna 36 preferably is substantially completely shielded from the transmitting antenna 34, or else a switching device is provided as set forth hereinafter in order alternatively to connect the transmitting and receiving antenna to their respective circuits.

The demodulated audio frequency output of the detector is connected at 60 to a band pass filter 62. As will appear presently, the band pass filter is tuned by the device 46 actuated from the aneroid barometer. The filter is tuned to the transmitter modulating frequency and will pass a band on each side thereof corresponding to the frequencies determined in accordance with the plus or minus eight hundred feet altitude variation as heretofore determined. As will be apparent, the modulating signals from aircraft which are vertically displaced a greater distance than this will be rejected.

The band pass filter is connected to a relay 64 for causing the light 50 to be energized, and for causing operation of the buzzer 52. The band pass filter also is connected at 66 to a buffer amplifier 68, which in turn is connected at 70 to a limiter 72. As will be understood by those skilled in the electronic art, the buffer amplifier and limiter could be combined in a single stage, if so desired. The output of the limiter 72 is connected at 74 to a difference circuit 76 actuating the height meter 54.

As also will be explained presently, the difference circuit is tuned by the device 46 actuated by the barometer. The difference circuit is tuned to a mean frequency identical with that of the variable frequency oscillator 26. If the detected signal received from an adjacent aircraft is above or below this mean frequency, the height meter 54 will deflect to one side or the other a distance proportional to the difference in altitude of the two aircraft, and in a direction to indicate whether the adjacent aircraft is above or below the primary aircraft.

FIG. 4 is generally equivalent to FIG. 3, and represents a suitable schematic wiring diagram. Thus, the connections at 42 into the discriminator are connected to an input or primary coil 78 which is coupled inductively to a secondary or output coil 80. The output coil 80 is connected in parallel with a capacitor 82 and forms therewith a tuned circuit. This tuned circuit may be tuned to the carrier frequency. Preferably the receiver 40 comprises a superheterodyne receiver, and the tuned circuit thus preferably is tuned to the intermediate frequency of the receiver 40. The tuned circuit is connected across a diode rectifier 84 having a resistor 86 and capacitor 88 connected in parallel to the cathode circuit. The foregoing constitutes the detector 58.

The band pass filter 62 comprises a pair of tuned circuits 90 and 92, each comprising variable capacitor 94 and inductor 96. The inductors 96 are inductively coupled to one another, and the coupling thereof is variable as is indicated at 98. The inductance of the coupling, and the capacitance of the capacitors 94 are simultaneously adjusted by means of the device or link 46 previously indicated.

As will be apparent, any signal passed by the band pass filter will normally be proportional to the transmission distance. Accordingly, the distance meter 56 simply comprises an audio frequency ammeter directly connected to the output of the band pass filter, as at 100. As will be appreciated, the direct coupling 100 could be replaced by a vacuum tube stage, if so desired, in order to avoid loading the circuit. The strength of the signal occasionally varies in accordance with factors other than distance, and the meter 56 therefore cannot be relied upon as giving a completely accurate indication of distance. However, the indication will be sufficient to give the pilot an approximate idea as to whether the adjacent aircraft is dangerously close, or merely within the space previously delineated. Additionally, the distance meter will allow the pilot to estimate how rapidly the other aircraft is approaching. It will be appreciated that the precise distance and rate of approach need not be known, as it is height variation that is relied upon to prevent collision.

The relay 64 also is directly connected to the band pass filter, although an isolating vacuum tube stage could be used, if so desired. The relay 64 comprises a relay coil 102 acting to actuate an armature 104. The coil is grounded through a current limiting resistor 106, and the armature 104 is arranged to contact a fixed contact 108 when the armature is attracted toward the coil. The fixed contact 108 is connected to a suitable voltage as indicated at V. The armature 104 is connected to the light 50 and to the buzzer 52, and the light and buzzer preferably are grounded to complete the circuit. Whenever an adjacent aircraft is sufficiently close and within the proscribed altitude range, a signal will be detected by the detector 58 and passed by the band pass filter 62 to actuate the relay 64, and thereby to energize the light 50 and buzzer 52. The light and buzzer will alert the pilot to the proximity of the other aircraft, and thereby call his attention to the height meter 54 and the distance meter 56 to indicate the type of evasive action to be taken, and the speed with which such action must be taken.

The connection at 66 from the band pass filter conveniently leads to a potentiometer 110 having the slider 112 thereof connected to the control grid of a vacuum tube 114. The vacuum tube is conventionally connected to form the buffer amplifier 68, having a resistance-capacitance cathode biasing circuit 116, and a plate load resistor 118. The output of the buffer amplifier 68 is connected through a capacitor 120 to a line or connector 122. This is shunted by a diode 124 connected to form the limiter 72, the cathode being connected to the slider 126 of a potentiometer 128 connected to B+ potential. It will be apparent that this will limit the peak amplitude of the detected signal, but in so doing will distort the wave form. This distortion is not of very great importance, since it is the frequency that is relied upon. However, it will be apparent that other forms of limiters could be used to preserve the wave form, such as a circuit similar to an automatic volume control circuit. Such a limiter could be combined with the buffer amplifier 68 if so desired.

The difference circuit 76 comprises a pair of generally similar tuned circuits 130 and 132. The circuit 130 includes an inductance 134, and a variable capacitor 136, while the circuit 132 includes an inductance 138 and a variable capacitor 140. The variable capacitors 136 and 140 are ganged and are variable by means of the device 46 operated by the barometer. The two circuits 130 and 132 are respectively tuned to frequencies above and below the mean frequency (the coding frequency of the oscillator 26) by equal amounts corresponding to the plus or minus eight hundred feet altitude differential previously established. The circuit 130 is connected to the plate of a diode or other rectifier 142, while the circuit 132 is similarly connected to the cathode of a diode or other rectifier 144. The cathode of the rectifier 142 is grounded through a capacitor 146, while the plate of the rectifier 144 is grounded through a capacitor 148. The cathode of the rectifier 142 also is connected to a fixed resistor 150, and the plate of the rectifier 144 is connected to a fixed resistor 152. The fixed resistors 150 and 152 are interconnected by a potentiometer resistance 154 having the sliding tap 156 thereon connected to the height meter 54.

If the detected frequency is identical with that of the oscillator 26, then it will be the frequency to which the difference circuit is set. The tuned circuits 130 and 132 will conduct equally, as will the diodes 142 and 144, and there will be no output voltage. Accordingly, the meter 54, which is a center reading instrument, will remain at its normal central position. This, coupled with the light and buzzer will inform the pilot that there is another aircraft within dangerous distance, and at the same elevation. If the detected signal should have a frequency either above or below the mean, then one of the circuits 130 and 132 will conduct more than the other. This will cause a difference in output of the diodes, and there will be a resulting unbalance of voltage which will cause the meter 54 to deflect either up or down in accordance with the relative altitude position of the other airplane. The distance which the meter will deflect depends on the actual altitude variation. The pilot thus will know whether the adjacent aircraft is above or below his plane, by how much, and thus immediately can take the necessary evasive action to avoid collision.

In accordance with the foregoing primary embodiment of the invention, the pilot is warned when another aircraft is within a given range and altitude of his aircraft. He is informed as to whether the other aircraft is above or below his aircraft, and the approximate distance. However, he does not know the direction of the other aircraft. A modification of the invention is illustrated in FIG. 5 which provides an indication of direction.

More specifically, the receiving antenna 36a is rotatably mounted, and is constantly rotated at a low rate of speed by a motor 158 which is conveniently driven by an alternating current generator 160. The height meter 54a is similar to that previously described, but is provided with an additional pointer 162 which is connected by any suitable or known means, such as a selsyn 164 and a cable 166, to the antenna. The pointer 162 thus at all times points in the direction of the antenna, and the antenna is made rather sharply directional. Thus, when a signal is received, the pilot need only look at the pointer 162 in order to know the direction of the adjacent aircraft relative to his own aircraft. Conveniently the face of the meter 54a is divided at least into quadrants to aid the pilot in reading the direction.

It has been indicated heretofore that the receiving antenna of any aircraft should be shielded from its own transmitting antenna. As a variation thereof, the transmitting and receiving antennae are alternately connected. Thus, as shown in FIG. 6, the transmitting antenna 34b is connected to the transmitter 30b through a double throw switch 168, one contact of which is connected to the transmitter, and the other to ground. Similarly, the receiving antenna 36b is connected to a switch 170 having one contact connected to the receiver 40b, and the other contact grounded. The switches 168 and 170 are ganged as at 172, and are operated by means such as a cam 174 and follower 176. The cam is driven by a motor 178 operated by an alternator 180. As will be appreciated, electronic or other mechanical switching means could be used. In fact, a single antenna might be used and alternately connected to the transmitter and to the receiver.

In FIG. 7 there is illustrated a system for automatically causing a plane to climb or descend, according to whether a dangerously adjacent aircraft is higher or lower. The height meter 54c is connected as at 182 to move a brush or pickup 184 back and forth in accordance with the movement of the pointer indicating the relative altitude. The brush 184 is connected through a voltage source, shown as a battery 186, to the auto pilot 188 of the aircraft. The brush is arranged to engage either of a pair of arcuate contacts 190 and 192, which are separately connected at 194 and 196 to the auto pilot. Thus, if the height meter indicates another aircraft above or below the primary aircraft, it will cause the brush 184 to engage one or the other of the contacts 190 and 192 to act on the auto pilot to cause the plane to climb or descend. It is contemplated that the contact for causing the plane to descend might be omitted, and in this case the lowermost plane would stay on course, while the higher one would rise. This would preclude any danger of bringing the lowermost aircraft into dangerous proximity with the ground, or with high objects on the ground. As will be appreciated, pneumatic, hydraulic, or mechanical means could be used to connect the height meter to the auto pilot, rather than the exemplary electric means shown.

A further modification of the invention is shown in FIG. 8. The receiving antenna 36d is connected to the receiver 40d and this in turn is connected to a detector 198 connected to an electromagnet 200. A plurality of tuned reeds 202 is positioned in the field of the electromagnet. The receiving antenna 36d is only partially shielded from the transmitting antenna, and accordingly one of the reeds will vibrate at high amplitude in accordance with the altitude of the primary aircraft. The modulating signals of all the other aircraft within the designated distance range also will appear at the electromagnet, and hence reeds corresponding to the altitudes of all adjacent aircraft will vibrate, but with lesser amplitude. Thus, the pilot can readily ascertain the relative altitudes of all adjacent aircraft. As will be understood, there would preferably be a large number of reeds provided for this purpose, and there might be more than one magnet 200 connected in parallel, thus satisfactorily to actuate reeds throughout the entire range.

It is to be understood that the specific embodiments of this invention as herein shown and described are for illustrative purposes only. Various changes in structure will no doubt occur to those skilled in the art, and are to be understood as forming a part of this invention insofar as they fall within the spirit and scope of the appended claims.

The invention is claimed as follows:

1. A system for preventing aircraft collisions comprising: means converting atmospheric pressure into mechanical motion, mounted in a first aircraft; a radio transmitter mounted in said first aircraft and operating at a predetermined fixed carrier frequency; modulating means for said transmitter; means mechanically coupling said mechanical motion to said modulating means for varying the modulation of said carrier frequency in accordance with the barometric altitude of said first aircraft; a radio receiver mounted in said first aircraft and tuned to said predetermined fixed carrier frequency for receiving the signals from a like fixed carrier frequency transmitter mounted in a second, proximate aircraft and modulated in accordance with the barometric altitude thereof, said radio receiver including a detector; indicating means operated from said detector and providing a perceptory signal indicative of the proximity of said second aircraft; a limiter connected to said detector and receiving the detected modulating frequency therefrom; a comparing circuit receiving the limited modulating frequency and having mechanically variable capacitance means; and linkage means mechanically coupling said mechanical motion to said capacitance means whereby said comparing circuit provides an output indicative of the relative altitude between said first and second aircraft.

2. A system for preventing aircraft collisions as set forth in claim 1 and further comprising a band pass filter connected to said detector and to said limiter, said band pass filter including mechanically variable capacitance means, said system further comprising linkage means mechanically coupling said mechanical motion to the capacitance means in said band pass filter whereby said filter passes detected modulating frequencies only within a predetermined altitude range.

3. A system for preventing aircraft collisions as set forth in claim 1 and further comprising means for indicating the range of said second aircraft, said range indicating means being connected to said detector independently of said limiter.

4. A system for preventing aircraft collisions comprising: means converting atmospheric pressure into mechanical motion, mounted in a first aircraft and including an aneroid barometer; a radio transmitter mounted in said first aircraft and operating at a predetermined fixed carrier frequency; modulating means for said transmitter; means mechanically coupling said mechanical motion to said modulating means for varying the modulation of said carrier frequency in accordance with the barometric altitude of said first aircraft; a radio receiver mounted in said first aircraft and tuned to said predetermined fixed carrier frequency for receiving the signals from a like fixed carrier frequency transmitter mounted in a second, proximate aircraft and modulated in accordance with the barometric altitude thereof, said radio receiver including a detector; indicating means operated from said detector and providing a perceptory signal indicative of the proximity of said second aircraft; a limiter connected to said detector and receiving the detected modulating frequency therefrom; a comparing circuit receiving the limited modulating frequency and having mechanically variable capacitance devices; a band pass filter connected to said detector and to said limiter, said band pass filter having mechanically variable capacitance devices; and linkage means mechanically coupling said mechanical motion to said variable capacitance devices whereby said comparing circuit provides an output in accordance with the relative altitude of said first and second aircraft and whereby said filter passes detected modulating frequencies only within a predetermined altitude range.

References Cited in the file of this patent

UNITED STATES PATENTS

| | | |
|---|---|---|
| 1,983,079 | Hansen | Dec. 4, 1934 |
| 2,003,240 | Brockstedt | May 28, 1935 |
| 2,137,241 | Dunmore | Nov. 22, 1938 |
| 2,157,122 | Dunmore | May 9, 1939 |
| 2,393,624 | Ferrill | Jan. 29, 1946 |
| 2,403,603 | Korn | July 9, 1946 |
| 2,499,349 | Ayres | Mar. 7, 1950 |
| 2,505,314 | Wallace | Apr. 25, 1950 |
| 2,568,568 | Stansbury | Sept. 18, 1951 |
| 2,886,796 | Wallace | May 12, 1959 |